United States Patent [19]
Grundberg

[11] 3,958,168
[45] May 18, 1976

[54] ELECTRONIC CONTROL CIRCUIT

[76] Inventor: Kenneth Grundberg, 3012 Maplewood St., Royal Oak, Mich. 48073

[22] Filed: Mar. 19, 1974

[21] Appl. No.: 452,572

Related U.S. Application Data

[63] Continuation of Ser. No. 322,395, Jan. 10, 1973.

[52] U.S. Cl................................ 321/2; 331/112; 315/209 CD
[51] Int. Cl.² ........................................ H02M 3/335
[58] Field of Search...... 321/2; 315/209 CD, 241 R; 323/DIG. 1; 331/112

[56] References Cited
UNITED STATES PATENTS

| | | | |
|---|---|---|---|
| 2,854,615 | 9/1958 | Light | 321/2 |
| 2,920,259 | 1/1960 | Light | 323/DIG. 1 |
| 2,946,924 | 7/1960 | Gerlach et al. | 321/2 |
| 3,316,445 | 4/1967 | Ahrons | 321/2 |
| 3,331,033 | 7/1967 | Johnston | 321/2 |
| 3,417,306 | 12/1968 | Knak | 321/2 |
| 3,435,320 | 3/1969 | Lee et al. | 321/2 |
| 3,531,737 | 9/1970 | Thakore | 321/2 |
| 3,569,779 | 3/1971 | Luursema | 331/112 |
| 3,612,060 | 10/1971 | Colyer | 331/112 |
| 3,629,682 | 12/1971 | Boelter | 321/2 |
| 3,639,826 | 2/1972 | Grundberg | 321/2 |
| 3,721,884 | 3/1973 | Thakore | 331/112 |

FOREIGN PATENTS OR APPLICATIONS

| | | | |
|---|---|---|---|
| 949,628 | 2/1964 | United Kingdom | 321/2 |
| 1,134,705 | 8/1962 | Germany | 331/112 |

Primary Examiner—William M. Shoop

[57] ABSTRACT

A pulse discharge electronic control circuit for providing an output signal of predetermined electrical energy and duration for engine ignition, missile firing or the like, the circuit having no moving parts and including means for producing electrical oscillations, means for storing the electrical energy thereof, and means for discharging the stored energy through a load, means also being included for providing high and low voltage output, alternating and regulated current output, and regulated voltage output and for converting alternating to direct current at a higher or lower level than the input signal at a theoretical one hundred percent efficiency.

9 Claims, 6 Drawing Figures

ELECTRONIC CONTROL CIRCUIT

This is a continuation of application Ser. No. 322,395 filed Jan. 10, 1973.

BACKGROUND OF THE INVENTION

1. FIELD OF THE INVENTION

The invention relates to means for and a method of providing electrical output signals which may be control signals or only regulated, converted or inverted signals. More specifically the invention refers to a control circuit for and method of providing controlled electrical pulse output signals for engine ignition or missile firing or the like.

2. DESCRIPTION OF THE PRIOR ART

In the past, circuits for providing electrical pulse output signals for igniting turbine engines and regulated, converted or inverted output signals or the like have been deficient in the efficiency with which energy has been developed, stored and/or dissipated through the load. Thus, electromagnetic and electrohydraulic systems have been used in the past to provide energy for or for transferring energy to a storage device and/or for subsequently discharging the energy through a load with resultant low efficiency in energy transformation.

In addition, in firing missiles such as grenades and the like, it is desirable to have a means for and method of producing a pulse of electrical energy of positively known magnitude on command and to be assured at the time of command that the required energy is available. With prior control circuits, an electrical signal at a predetermined voltage level together with an indication of the correct voltage level has not been available in a reasonably compact, reliable, inexpensive form.

SUMMARY OF THE INVENTION

The invention therefore includes the provision of a control circuit for and a method of providing electrical output signals for ignition of turbine engines or control of firing of missiles or the like which is simple, economical and efficient.

The control circuit of the invention includes an oscillator for developing electrical pulses, means for storing the electrical pulses and for periodically discharging the electrical pulses across a load at low or high voltage. Optional means for regulating the oscillator may be included in the control circuit in accordance with the invention. In the control circuit of the invention transformer means are provided for transfer of electrical energy from the oscillator to the storage device whereby the transfer is particularly efficient.

In addition, the control circuit of the invention may include means for maintaining the signal on the storage means at a predetermined level before discharge together with means for indicating the voltage at the predetermined level and for providing discharge from the storage means only on command. Also, the control circuit includes means for cutting off the oscillator during discharge of the storage means.

In one modification of the invention a circuit is disclosed for providing a converted alternating to direct current, regulated or inverted output signal at a level either above or below the level of the input signal at a theoretical one hundred percent efficiency over a wide range of supply voltages and loads.

The method of providing the electrical output signals in accordance with the invention includes developing electrical oscillations, storing the electrical energy derived from the oscillations and discharging the stored electrical energy through a load. The electrical energy may be discharged through the load continuously at predetermined uniform intervals or only on command. As indicated above, the stored energy may be indicated when the energy is to be discharged on command and the method of providing electrical output signals may include the steps of stopping the development of electrical oscillations during discharge of the storage device and charging or discharging the storage device in accordance with the voltage level of the electrical energy stored therein.

DESCRIPTION OF THE PREFERRED EMBODIMENTS

Figure 1:
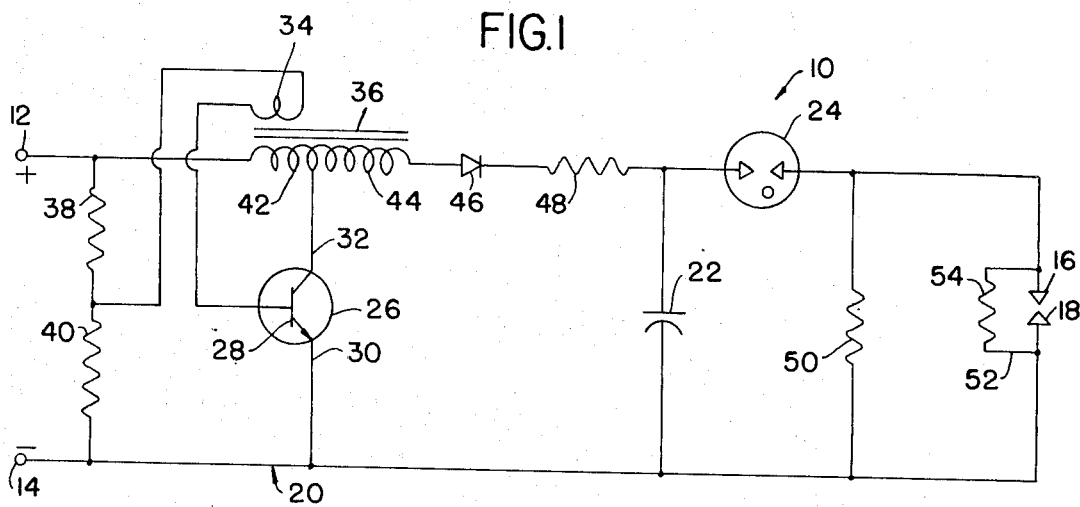
FIG. 1 is a schematic diagram of an electrical control circuit constructed in accordance with the invention particularly suited for engine ignition use.

The electronic control circuit 10 illustrated in FIG. 1 may be connected to a plurality of different sources of electrical energy across the terminals 12 and 14 including, for example, a direct current source or alternating current sources of varied frequency of, for example, up to 30 volts and will produce an output pulse across the electrodes 16 and 18 of the air gap igniter 52 at a relatively low voltage and at a frequency determined by the magnitude of the input voltage, the frequency of the oscillator circuit 20, the magnitude of the capacitor storage device 22 and the breakdown voltage of the spark gap structure 24.

More specifically, the oscillator circuit 20 includes the transistor 26 having the base 28, emitter 30 and collector 32, as shown in FIG. 1. The base 28 of the oscillator semi-conductor 26 is connected through a secondary portion 34 of the electrical reactance transformer 36 to a central point of the voltage divider including the resistors 38 and 40 connected across the electric terminals 12 and 14. The emitter 30 of the transistor 26, as shown, is connected to the terminal 14, while the collector of the transistor 26 is connected to the terminal 12 through the primary portion 42 of the transformer 36.

Additionally, the secondary portion 44 of the transformer 36 is connected through the rectifying diode 46 and resistance 48, while resistance is not necessary to the operation of the circuit 10, to one side of the capacitor storage device 22. The other side of the capacitor storage device 22 is connected to the terminal 14.

A protecting resistor 50 is provided across the air gap igniter 52 which includes the resistance 54 in addition to the terminals 16 and 18 to provide a load for the circuit 10 with the air gap igniter removed. The air gap igniter 52 may, for example, be a spark plug in which case the resistance 54 may not be a physical resistor.

In overall operation of the electronic control circuit 10, when the circuit 10 is connected across a source of electrical energy at the terminals 12 and 14, a voltage appears across the resistor 40 of the voltage divider to provide a forward bias on the oscillator transistor 26 to produce electrical oscillations. The oscillator transistor 26 will conduct through the primary portion 42 of the transformer 36 to induce a signal in the secondary portion 34 of the transformer 36 aiding to the bias applied to the base of transistor 26 due to the signal applied across terminals 12 and 14. The signal induced in the secondary portion or feedback winding 34 keeps the transistor 26 conducting, establishing an electromagnetic field in the transformer 36. When the current through the transistor 26 reaches a predetermened value, the voltage drop across the transistor 26 begins to rise sharply, decreasing the voltage drop across the secondary portions 34 and 44; and the transistor 26 switches to a nonconducting state. The energy induced in the secondary portion 44 by the collapsing electromagnetic field of the transformer 36 then transfers through the diode 46 and the resistor 48 to the capacitor 22. When substantially all the energy is transferred, the transistor 26 switches to a conducting state and again begins to store energy in the secondary portion 44, repeating the previously described cycle.

After a number of cycles of the oscillator 20, the signal stored on the capacitor 22, which it is pointed out is transferred to the capacitor 22 from the oscillator 20 with a theoretical one hundred percent efficiency due to the transformer energy transfer arrangement provided, will be of a magnitude to cause the spark gap structure 24 to become conductively ionized. The voltage stored in the capacitor 22 will on breakdown of the spark gap structure 24 rapidly discharge through the electrodes 16 and 18 of the igniter 52 to, for example, ignite a turbine engine. After discharge of the capacitor 22, the spark gap structure 24 will de-ionize and the complete cycle of operation of the electronic control circuit 10 will be repeated.

As will be understood by those in the art, the voltage provided across the electrodes 16 and 18 of the air gap igniter will be relatively low with the control circuit 10. Provided a higher voltage across the electrodes 16 and 18 of the igniter 52 is desired, the circuit of FIG. 1 may be modified as illustrated in FIG. 2.

Figure 2:
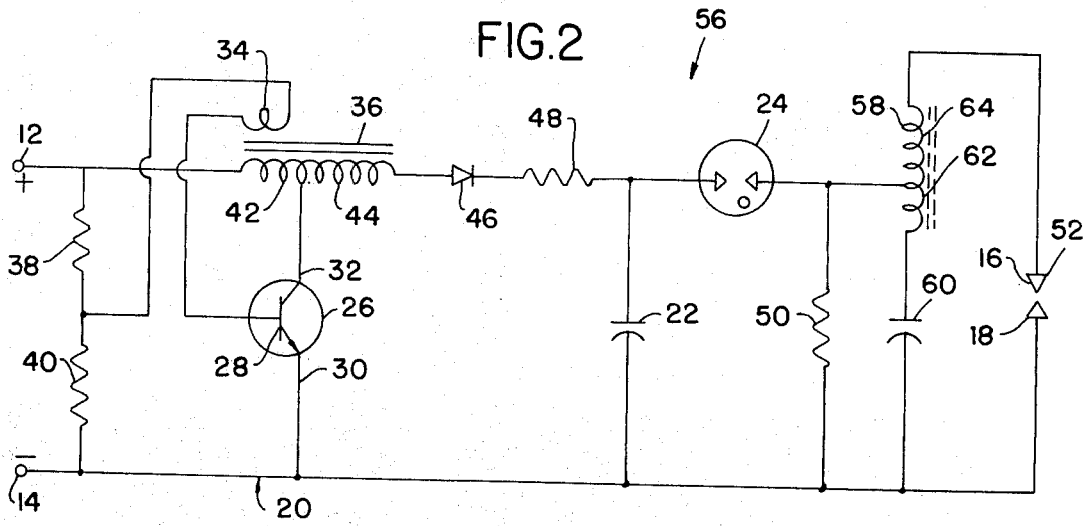
FIG. 2 is a schematic diagram of a circuit as in FIG. 1 but modified to increase the outpt voltage thereof.

The circuit 56 of FIG. 2 is exactly the same as the circuit 10 of FIG. 1, except for the inclusion therein of the discharge transformer 58 and the additional capacitor 60. In addition, the resistor 54 of the air gap igniter is not shown since it is not essential in the operation of either circuit 10 or 56. The similar components in circuits 10 and 56 have been given the same reference characters.

In operation of the modified electronic control circuit 56, on breakdown of the spark gap 24, the capacitor 22 discharges through the primary portion 62 of the transformer 58 into the capacitor 60, whereby an electrical signal of increased voltage is provided across the electrodes 16 and 18 through the secondary portion 64 of the transformer 58.

Figure 3:
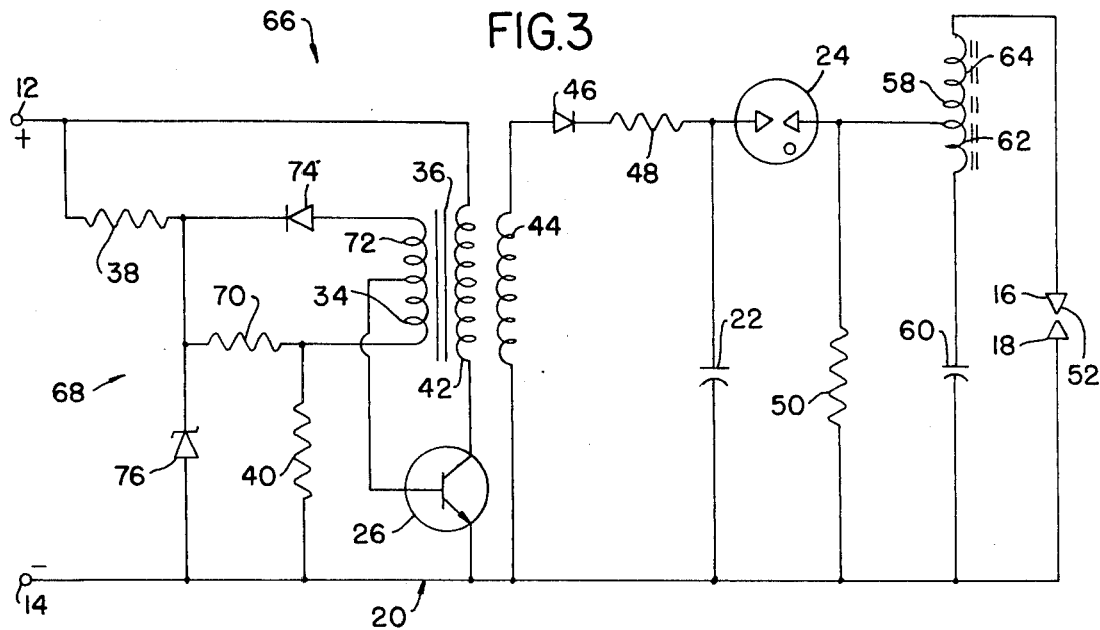
FIG. 3 is a schematic diagram of a circuit similar to that in FIG. 2 but modified to provide a more constant output pulse repetition rate irrespective of input voltage variations.

With both the circuits 10 and 56 of FIGS. 1 and 2, the frequency of the output signal across the electrodes 16 and 18 will vary with the magnitude of the input electrical signal across the terminals 12 and 14 with the rest of the circuit constants identical. The modified electronic control circuit 66 illustrated in FIG. 3 is the same as the control circuit of FIG. 2, except for the regulating circuit 68 to provide a more uniform output frequency across the electrodes 16 and 18. Thus, the similar components have again been given similar reference characters in FIG. 3.

The regulating circuit 68, as shown in FIG. 3, includes an additional resistor 70 in the voltage divider circuit between the terminals 12 and 14 and between the resistors 38 and 40 which are connected thereto and the additional secondary portion 72 in the transformer 36, the diode 74 and the voltage threshold device which, for example, could be a Zener diode 76.

With the regulating circuit 68 connected as shown in FIG. 3, the initial voltage applied to the oscillator transistor 26 is controlled by the Zener diode 76 maintaining a substantially constant voltage across the resistors 70 and 40. If, in the operation of the oscillator 20, the voltage across the primary portion 42 of the transformer 36 increases beyond a predetermined limit, the electrical signal developed in the secondary portion 72 of the transformer 36 will provide a current through the diode 74, Zener diode 76 and resistance 40 and the transformer feedback winding or secondary portion 34 in opposition to the current flow produced due to the source of electrical energy across the terminals 12 and 14 through the resistors 38, 70 and 40 to reduce the bias on the transistor 26 whereby the current flow is reduced to maintain the voltage across the primary portion 42 at the predetermined value.

Thus, it will be seen that with the regulating circuit 68 in the control circuit 66 of FIG. 3 a substantially constant signal is fed to the capacitor during each oscillation of the oscillator 26, whereby the charge is built up on capacitor 22 in a uniform manner and the frequency of discharge of the capacitor 22 is thus maintained substantially constant even though the input voltage across the terminals 12 and 14 may vary considerably.

Figure 4:
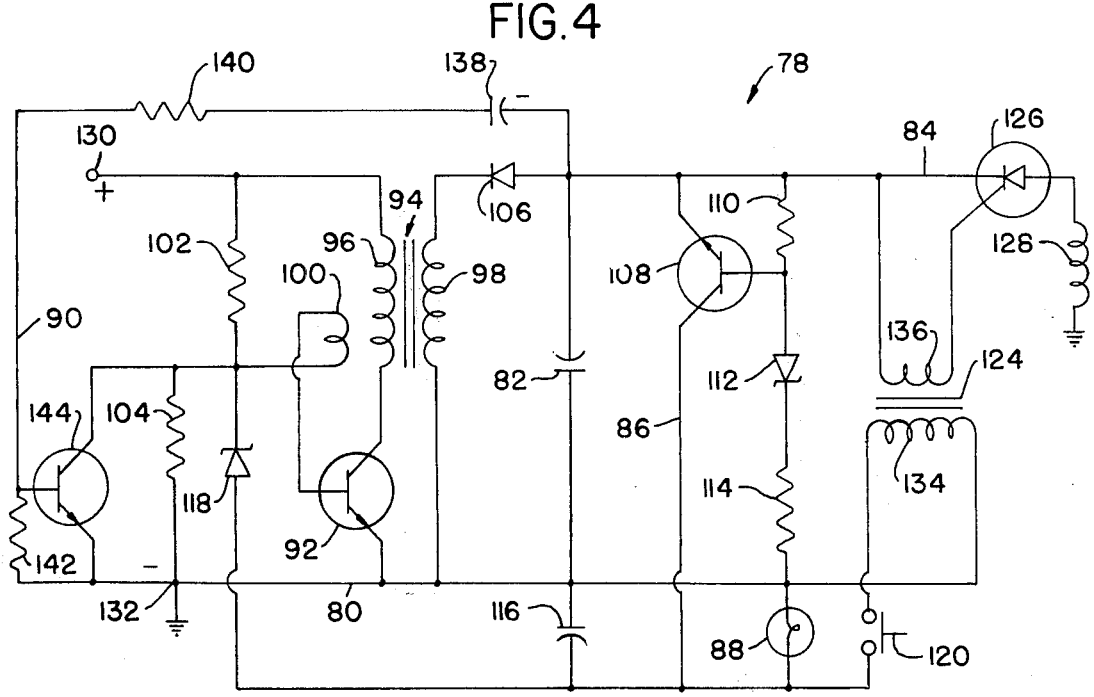
FIG. 4 is a schematic diagram of a second embodiment of the invention particularly suited for missile firing.

The embodiment 78 of the control circuit of the invention illustrated in FIG. 4 includes the oscillator circuit 80, a storage capacitor 82 and a trigger circuit 84 through which the capacitor 82 is discharged. The circuit 86 of the control circuit 78 is provided to maintain a predetermined charge on the capacitor 82 indicated by the light 88. The circuit 90 prevents operation of the oscillator circuit 80 during discharge of the capacitor 82 through the trigger circuit 84.

The oscillator circuit 80 again includes the oscillator transistor 92, transformer 94 having the primary winding 96 and the secondary windings 98 and 100, and the voltage divider including resistors 102 and 104. Operation of the oscillator circuit 80 is as considered in conjunction with control circuit 10. The capacitor 82 is again charged through a rectifying diode 106.

The circuit 86 for maintaining a predetermined charge on the capacitor 82 includes the transistor 108 connected to conduct in response to a bias applied thereto on current flow through the resistor 110. Current flows through the resistor 110 on conduction of the voltage threshold device, which could, for example, be a Zener diode 112 in series with the resistor 110 and resistor 114 across the capacitor 82. Resistors 110 and 114 are not essential. Circuit 86 further includes the light 88, capacitor 116 and voltage threshold device, which could, for example, be a Zener diode 118 connected as shown in FIG. 4.

In operation a voltage is applied across terminals 130 and 132, as before, to provide a bias for the oscillator transistor 92 across the resistor 104 of the voltage divider to cause the oscillator 92 to conduct through the transformer primary portion 96. The signal induced in the feedback winding or secondary portion 100 keeps the transistor 92 conducting, establishing an electromagnetic field in the transformer 92. When the current through the transistor 92 reaches a predetermined value, the voltage drop across the transistor 92 begins to rise sharply, decreasing the voltage drop across the secondary portions 98 and 100; and the transistor 92 switches to a nonconducting state. The energy induced in the secondary portion 98 by the collapsing electromagnetic field of the transformer 92 then transfers to the capacitor 82. When substantially all the energy is transferred, the transistor 92 switches to a conducting state and again begins to establish an electromagnetic field in the transformer 94, repeating the previously described cycle.

The signal built up on the capacitor 82 over several cycles of the oscillator 80 will eventually reach a predetermined value which it is desired to maintain on the capacitor 82. With the desired voltage on the capacitor 82, say, for example, 120 volts, the Zener diode 112 will conduct to provide a forward bias on the transistor 108 partially, whereby the transistor 108 conducts to build up a voltage on the capacitor 116 as well as light the light 88 indicating the desired voltage on the capacitor 82.

At a predetermined level of charging of the capacitor 116, the Zener diode 118 will be caused to conduct so that the transistor 92 will be cut off preventing additional charging of the capacitor 82. When capacitor 116 has discharged slightly through the resistor 102 and the Zener diode 118, the voltage at the junction of the resistors 102 and 104 rises sufficiently to permit one cycle of oscillation to maintain the predetermined charge on the capacitor 82.

The above indicated operation will continue indefinitely to maintain the voltage on the capacitor 82 until the trigger switch 120 in the trigger circuit 84 is closed whereby a pulse of electrical energy is passed through the primary portion 134 of the transformer 124 to the secondary portion 136 thereof. A trigger pulse is thus provided on the trigger electrode of an electrically actuatable switching device, which, for example, could be a silicon controlled rectifier 126 to cause the rectifier 126 to conduct and provide a discharge path for the capacitor 82 through the solenoid 128 or other load structure such as an ordinary electric dynamite cap. The solenoid 128 may be connected to fire a missile such as a grenade, or perform other functions as desired. It should be noted that the silicon controlled rectifier 126 could be readily replaced by a relay or other triggerable, current-switching device.

The circuit 90 which includes the capacitor 138, resistor 140 and resistor 142 in series therewith and the transistor 144 connected as shown in FIG. 4, will cause the oscillator 80 to cease oscillating during the discharge of the capacitor 82 and for a period thereafter sufficient for the silicon controlled rectifier 126 to fully turn off. The trigger 120 must be closed to provide each actuating impulse through the load 128.

Thus, in operation, the capacitor 128 will charge in the polarity shown during charging of the capacitor 82 to maintain the transistor 144 in an off condition.

When the capacitor 82 discharges the left side of the capacitor 138 goes from zero to approximately 120 volts positive, for example, to provide a bias on the transistor 144 turning the transistor 144 on. With the transistor 144 turned on the base of transistor 92 will be substantially grounded to maintain the oscillator 80 in an off condition until the charge on the capacitor 138 is dissipated sufficiently to lower the bias on transistor 144 to the non-conducting level again.

Figure 5:
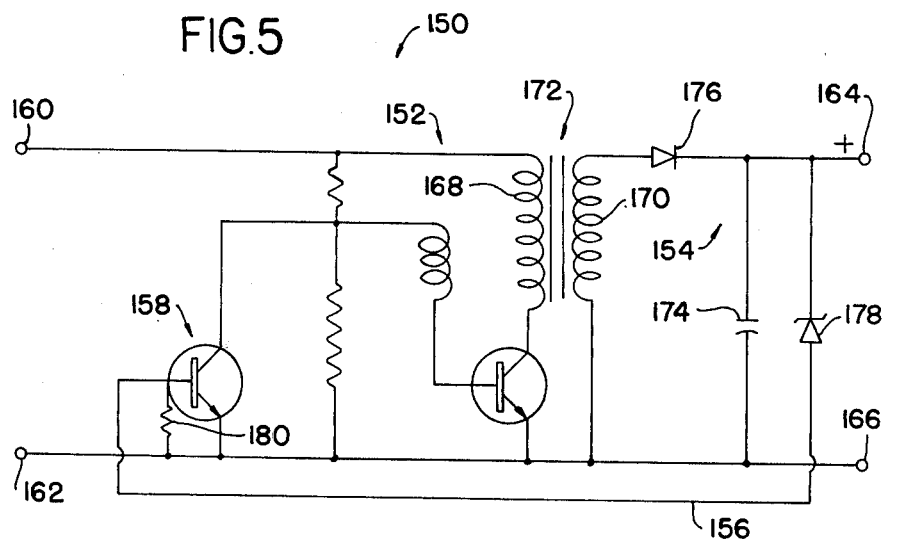
FIG. 5 is a schematic diagram of another embodiment of the invention particularly suited for providing a regulated, converted or inverted output at a chosen signal level with high efficiency over a range of input signals and loads.
Figure 6:
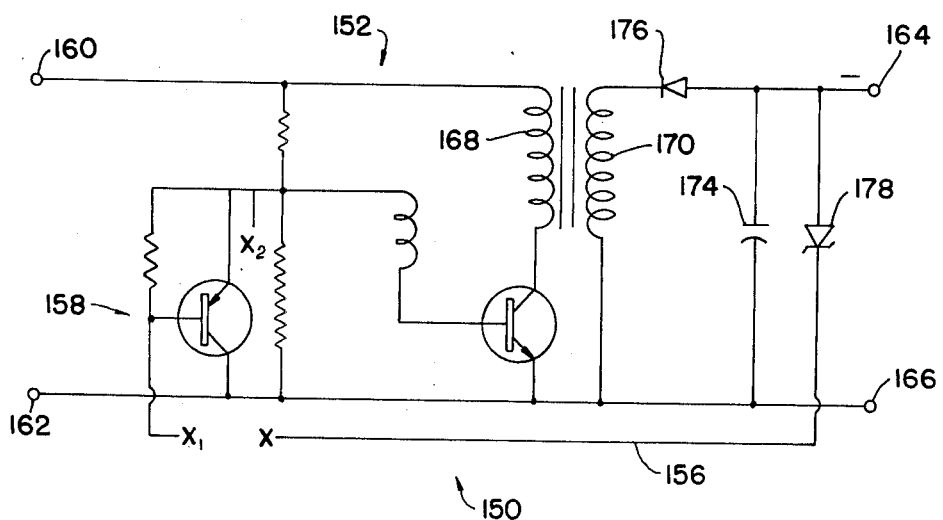
FIG. 6 is a schematic diagram of a circuit as in FIG. 5 but modified to provide the opposite output polarity.

The embodiment of the invention illustrated in FIGS. 5 and 6 is capable of receiving a direct or alternating current input signal over a wide range of supply voltage and providing a regulated output signal over a wide range of loads which output signal may be converted from alternating to direct current inverted in polarity and may be higher or lower in signal strength than the input signal. Further, the transfer of the signal from the oscillator portion of the circuit 150 to the storage portion of the circuit will be at a theoretical one hundred percent efficiency.

The circuit 150 includes the oscillator circuit 152, the storage circuit 154, the regulating and feedback circuit 156 and the buffer circuit 158. The input which may be a direct current signal or an alternating current signal having a wide range of voltage is applied to the terminals 160 and 162 while the output signal will be taken across the terminals 164 and 166.

The oscillator circuit 152 is entirely similar to the oscillator circuit 20 in both construction and function and will not therefore be considered in detail, except to point out that the separation of the primary portion 168 and the secondary portion 170 of the transformer 172 will not affect the function of the oscillator.

The storage circuit 154 is again similar to that of the modification 10 of the invention and includes the storage capacitor 174 and the diode 176. With the diode 176 in the circuit in one direction, as shown in FIG. 5, the signal stored on the capacitor 174 due to the signal from the oscillator circuit 152 will have a positive polarity. With the diode 176 turned in the opposite direction, as shown in FIG. 6, the signal on the capacitor 174 will be inverted in polarity so as to be negative at terminal 164, as shown in FIG. 6.

The output from the capacitor 174 is continuous and is regulated by the Zener diode 178 positioned with the proper polarity in accordance with the polarity of the signal at the terminal 164, as shown in FIGS. 5 and 6. The signal across the Zener diode 178 is further used as a feedback signal through the circuit 156 and across the resistor 180, as shown in FIG. 5, to control the signal input to the oscillator 152.

To isolate the control of the oscillator from the effects of the load on the feedback signal through the Zener diode 178 the buffer circuit 158 is provided. It will be understood that the feedback signal from the Zener diode 178 may be connected to regulate the oscillator circuits in a number of different positions, as shown for example in FIG. 6, where conductor end X may be connected at $X_1$, $X_2$ or $X_3$. The buffer circuit 158 is of course not necessary.

Thus in overall operation of the embodiment 150 of the invention, an input signal is provided across the terminals 160 and 162 which may be either an alternating or direct current signal to produce a pulsating signal through the transformer primary winding 168 as before to induce a pulsating signal in the transformer primary winding 168. The signals from the transformer secondary winding 170 are passed through the diode 176 and stored on the capacitor 174. The signal on the capacitor 174 is drained from the capacitor 174 through the terminal 164 and is maintained at a substantially constant voltage by the Zener diode 178 in conjunction with the input signal to the capacitor 174. The signal through the Zener diode 178 is fed back to the oscillator circuit 152 to regulate the input signal thereto in accordance with the signal on the capacitor 174. As indicated above, the feedback signal may be passed through the buffer amplifier circuit 158 to isolate the oscillator from the effect of, for example a changing load.

While three embodiments of the present invention and modifications thereof have been considered in detail, it will be understood that other embodiments and modifications are contemplated by the inventor. It is therefore the intention to include all embodiments and modifications as are defined by the appended claims within the scope of the invention.

What I claim as my invention is:

1. An electronic control circuit comprising a source of direct current electrical energy, a voltage divider including three resistances connected in series connected across the source of electrical energy, an oscillator connected across the source of electrical energy and to the voltage divider for providing an oscillating electrical signal including a semi-conductor device having emitter, base and collector electrodes, a transformer having primary and secondary windings and a feedback winding, said primary winding being connected directly to one side of the source of electrical energy at one end thereof and to the collector of the semi-conductor device at the other end thereof, the emitter of the semi-conductor device being connected to the other side of the power supply, said transformer feedback coil having a tap connected directly to the base of the semi-conductor device, a unidirectional device connected between one end of the feedback coil at one side thereof and to a point between a first and second of the three resistances in the voltage divider, the other end of the feedback coil being connected to a point on the voltage divider between the second and third resistances thereof, and a Zener diode connected on one side between the first and second resistances of the voltage divider and at the other side to the other side of the power supply, a second unidirectional device, a resistance and an energy storing capacitor connected in series across the secondary winding of the transformer, a spark gap and resistance connected in series across the energy storage capacitor, and output structure including an output transformer having primary and secondary portions connected between the series connected spark gap and resistance between the primary and secondary portions thereof, a capacitor connecting one end of the output transformer to the other side of the power supply, and a load connected between the other end of the output transformer and the other side of the power supply whereby periodic pulses of electrical energy are provided across the load.

2. A pulse discharge electronic control circuit comprising: an oscillator circuit for producing electrical oscillations and having a voltage divider, a first transistor and a first transformer, said voltage divider having a first resistor and a second resistor, one of the first resistor forming a first terminal of said voltage divider, the other end of the first resistor being operably coupled to one end of the second resistor and forming therewith a second terminal of said voltage divider, the other end of the second resistor forming a third terminal of said voltage divider, said first transistor having collector, base and emitter electrodes and said transformer having primary, secondary and feedback windings, the collector electrode of said first transistor being operably coupled through the primary winding of said first transformer to the first terminal of said voltage divider, the base electrode of said first transistor being operably coupled through the feedback winding of said first transformer to the second terminal of said voltage divider, and the emitter electrode of said first transistor being operably coupled to the third terminal of said voltage divider, the first terminal and the third terminal of said voltage divider being operably connectable across a source of unidirectional electrical energy to thereby provide predetermined voltages at the first and second terminals of said voltage divider for subsequent circuit operation;

an electrical charge storage circuit having a first electrical capacitor and a rectifying diode operably coupled in series across the secondary winding of said first transformer, the end of said first capacitor operably coupled to the secondary winding of said first transformer also being operably coupled to the third terminal of said voltage divider, thereby enabling said first capacitor to store electrical energy induced in the secondary winding as a result of the collapse of the electromagnetic field established in said first transformer by the electrical conduction of said first transistor and rectified by said rectifying diode;

a charge control circuit having a second transistor, a first voltage threshold device, a second voltage threshold device, and a second electrical capacitor, said second transistor having collector, emitter and base electrodes, said first voltage threshold device being operably coupled at one of its ends to the second terminal of said voltage divider and at its other end to one end of said second capacitor, the other end of said second capacitor being operably coupled to the third terminal of said voltage divider, the collector electrode of said second transistor being operably coupled to the electrical junction between said second capacitor and said first voltage threshold device, the emitter electrode of said second transistor being operably coupled to the electrical junction between said rectifying diode and said first capacitor, and said base electrode of said second transistor being operably coupled to a source of biasing potential, the second voltage threshold device being operably coupled between the base electrode of said second transistor and the third terminal of said voltage divider, thereby enabling the second voltage threshold device to conduct when the charge across the first capacitor reaches a predetermined value to transfer said second transistor to a state of partial conduction, charging said second capacitor and transferring said first transistor to a state of nonconduction, delaying the next cycle of oscillation of said oscillator until the charge on said first capacitor has dissipated to the predetermined value;

a discharge control circuit having a second transformer, a normally open, electrical trigger switch and an electrically actuatable switching device, said second transformer having a primary winding and a secondary winding, one side of the primary winding being operably coupled to the third terminal of said voltage divider and the other side of the primary winding operably coupled through said trigger switch to the electrical junction between said second capacitor and said first voltage threshold device, said electrically actuatable switching device having an input terminal, an output terminal and a trigger terminal, the input terminal of said switching device being operably coupled to the electrical junction between said rectifying diode and said first capacitor and to one side of the secondary winding of said second transformer, the trigger terminal of said switching device being operably coupled to the other side of the secondary winding of said second transformer and the output terminal of said switching device being operably connectable to a load, thereby directing an electrical energy pulse to the load whenever said trigger switch is effectively closed;

an oscillator control circuit having a third transistor and a third capacitor, said third transistor having emitter, collector and base electrodes, the emitter electrode of said third transistor being operably coupled to the third terminal of said voltage divider, the collector electrode of said third transistor being operably coupled to the second terminal of said voltage divider, and base electrode of said third transistor being operably coupled to a source of biasing potential and additionally through said third capacitor to the electrical junction between said rectifying diode and said first capacitor, thereby transferring said third transistor to a state of conduction and hence said first transistor to a state of nonconduction, inhibiting said oscillator, during the discharge time of said first capacitor.

3. A pulse discharge electronic control circuit as defined by claim 2 and additionally comprising an electrically responsive indicating device operably coupled across said second capacitor, thereby providing an indication of the presence of a predetermined electrical charge on said first capacitor.

4. A pulse discharge electronic control circuit as defined by claim 3 wherein said electrically responsive indicating device is an incandescent lamp.

5. A pulse discharge electronic control circuit as defined by claim 2 wherein said electrically actuatable switching device is a silicon controlled rectifier.

6. A pulse discharge electronic control circuit as defined by claim 2 wherein said electrical trigger switch is a normally open, single-pole, single-throw, momentary-contact switch.

7. A pulse discharge electronic control circuit as defined by claim 2 wherein the source of biasing potential operably coupled to the base electrode of said second transistor comprises an electrical resistance operably coupled between the base electrode and the emitter electrode of said second transistor.

8. A pulse discharge electronic control circuit as defined by claim 2 wherein the source of biasing potential operably coupled to the base electrode of said third transistor comprises an electrical resistance operably coupled between the base electrode and the emitter electrode of said third transistor.

9. A pulse discharge electronic control circuit as defined by claim 2 wherein said first voltage threshold device and second voltage threshold device are Zener diodes.

* * * * *